(12) United States Patent
Kato

(10) Patent No.: US 7,093,164 B2
(45) Date of Patent: Aug. 15, 2006

(54) INFORMATION PROCESSING APPARATUS AND MEMORY CARTRIDGE SYSTEM

(75) Inventor: Shuhei Kato, Kusatsu (JP)

(73) Assignee: SSD Company Limited, Shiga (JP)

( * ) Notice: Subject to any disclaimer, the term of this patent is extended or adjusted under 35 U.S.C. 154(b) by 472 days.

(21) Appl. No.: 09/978,013

(22) Filed: Oct. 17, 2001

(65) Prior Publication Data
US 2002/0049924 A1 Apr. 25, 2002

(30) Foreign Application Priority Data
Oct. 19, 2000 (JP) .............................. 2000-318944

(51) Int. Cl.
*G06F 11/00* (2006.01)
*G06F 1/26* (2006.01)
*A63F 13/00* (2006.01)

(52) U.S. Cl. ............................ 714/22; 714/23; 714/14; 713/340; 463/44

(58) Field of Classification Search .................. 714/23, 714/10, 14, 5, 721, 22; 713/340, 324; 463/44; 320/166; 702/64
See application file for complete search history.

(56) References Cited

U.S. PATENT DOCUMENTS 4,964,123 A * 10/1990 Umemoto ..................... 714/23
5,014,982 A * 5/1991 Okada et al. .................. 463/29
5,081,625 A * 1/1992 Rhee et al. .................... 714/55
5,408,648 A * 4/1995 Gokan et al. .................. 714/23
5,491,794 A * 2/1996 Wu ............................ 714/23
5,502,812 A * 3/1996 Leyre et al. ................... 714/10
5,537,584 A * 7/1996 Miyai et al. ................... 714/42
6,289,467 B1* 9/2001 Lewis et al. ................. 713/340
6,328,570 B1* 12/2001 Ng ........................ 434/307 A
6,378,027 B1* 4/2002 Bealkowski et al. ......... 710/302
6,405,328 B1* 6/2002 Vasanoja ..................... 714/55
6,496,881 B1* 12/2002 Green et al. .................. 710/58
6,611,917 B1* 8/2003 Yahara ....................... 713/320

\* cited by examiner

*Primary Examiner*—Robert Beausoliel
*Assistant Examiner*—Christopher McCarthy
(74) *Attorney, Agent, or Firm*—Arent Fox PLLC

(57) ABSTRACT

An information processing apparatus includes a high-speed processor, and the high-speed processor processes a game program restored in a memory cartridge. A power control routine is then executed, and capacitors (C4, C5) included in a charge pump circuit is repeatedly charged and discharged. If an error occurs in the high-speed processor and then the power control routine is not properly executed, a difference in electric potential ($V_C$) between one end of a resistor (R10) and a reference electric potential surface or point increases. When the difference in electric potential exceeds a threshold value, a supply of stabilized voltage is stopped by a power on/off control circuit, and an entire system including the high-speed processor is then turned off.

15 Claims, 3 Drawing Sheets ved to a home-use game device or a home-use karaoke device, for example, and processes a program stored in the memory cartridge when the cartridge is attached.

In addition, the present invention relates to a memory cartridge which is adapted to such the information processing apparatus or the memory cartridge system.

2. Description of the Prior Art

As conventional information processing apparatuses, there were apparatuses in which a so-called watch dog timer was provided in order to prevent a trouble which was caused at a time when a processor ran out of control, and the processor was reset immediately after an error was detected.

However, in the prior art, the processor was re-started after being reset because the processor was only reset while its power was still being supplied. Therefore, in such an information processing apparatus which processes a program stored in a detachable memory cartridge, there was a possibility that data in an internal memory is destroyed when the processor ran out of control as a result of extracting the memory cartridge.

That is, even if the processor was reset at a time of the out-of-control, the processor ran out of control again due to the re-start after the reset because the memory cartridge still remained extracted. Then, the processor is repeatedly reset and rendered out-of-control, and the data stored in a rewritable non-volatile memory inside the information processing apparatus or a backed-up memory was destroyed due to an error process in a case of the out-of-control.

SUMMARY OF THE INVENTION

Therefore, it is a primary object of the present invention to provide an information processing apparatus capable of preventing data destruction caused by out-of-control of a processor.

It is another object of the present invention to provide a memory cartridge system capable of preventing data destruction caused by out-of-control of a processor.

It is still another object of the present invention to provide a memory cartridge capable of preventing data destruction caused by out-of-control of a processor.

It is yet another object of the present invention to provide a home-use game device capable of preventing data destruction caused by out-of-control of a processor.

It is another object of the present invention to provide a home-use karaoke device capable of preventing data destruction caused by out-of-control of a processor.

An information processing apparatus according to the present invention is an information processing apparatus to which a memory cartridge having a program memory is attached, comprises: a system bus which is connected to a program memory upon attaching a memory cartridge; a processor which is connected to the system bus and processes a program recorded in the program memory; a detecting means which detects a processor error; and a stopping means which stops a power supply to the processor when the error is detected.

In the present invention, when the memory cartridge is attached, the program memory in the memory cartridge is connected with the processor via the system bus. The program recorded in the program memory is processed by the processor. If the processor error is detected by the detecting means in the course of the processing, the detecting means stops the power supply to the processor. By stopping the power supply to the processor, the program processing is also stopped.

In a case that the processor generates a pulse signal on the basis of the program and a charging and discharging means included in the detecting means repeatedly charges and discharges in response to the pulse signal, the stopping means stops a power supply when a charged voltage of the charging and discharging means does not meet a predetermined condition.

Preferably, the pulse signal is a signal having a level which varies between the low-level and the high-level in each predetermined period, and the charging and discharging means includes a first capacitor and a second capacitor. The first capacitor discharges an electric charge when the pulse signal is the low-level, and charges an electric charge when the pulse signal is the high-level. On the other hand, the second capacitor recharges an electric charge when the pulse signal is the low-level, and discharges the electric charge when the pulse signal is the high-level. When, the stopping means stops the power supply to the processor when a charged voltage of at least one of the first capacitor and the second capacitor exceeds a predetermined value.

In a case that an instruction is made to reset the processor by an instructing means, a discharging path is enabled in response to the instruction, and discharges the electric charge charged in the charging and discharging means.

According to the present invention, the power supply to the processor is stopped in either case that the processor error is detected or the charged voltage of the capacitor does not meet the predetermined condition due to the processing error. That is, it is not to say that the processor is reset but the power supply to the processor is stopped. Therefore, the data in the memory accommodated in the processor or connected to the processor is not destroyed even when an error occurs in the processor by extracting the memory cartridge.

In one aspect of the present invention a memory cartridge system comprises: a memory cartridge having a program memory; a processor is connected to the program memory upon attaching the memory cartridge and stored in the program memory; a capacitor which repeatedly charges and discharges in response to a pulse signal; and a stopping means which stops a power supply to the processor when a charged voltage of the capacitor does not meet a predetermined condition, wherein the program includes a level control program which changes a level of the pulse signal in each predetermined period to maintain the charged voltage within the predetermined condition.

In this aspect, when the memory cartridge is attached, the program memory of the memory cartridge is connected to the processor, and the program recorded in the program memory is processed by the processor. The level control program to change the level of the pulse signal in each predetermined period is included in the programs to be processed. The capacitor is repeatedly charged and discharged in response to the pulse signal level-controlled by the level control program. When the charged voltage of the capacitor does not satisfy the predetermined condition, the power supply to the processor is stopped by the stopping means. In other words, if and when the pulse signal is not appropriately level-controlled due to a processor error, the charged voltage of the capacitor does not meet the predetermined condition. As a result, the power supply to the processor is stopped.

Another aspect of the present invention is directed toward a memory cartridge which is detachably attached to an information processing apparatus which stops a power supply to a processor when a charged voltage of a capacitor does not meet a predetermined condition and stores a program allowing the processor to execute, and the program includes a capacitor control program which maintains the charged voltage of the capacitor within the predetermined condition by charging and discharging the capacitor in each predetermined period.

In this aspect, the information processing apparatus stops the power supply to the processor when the charged voltage of the capacitor does not meet the predetermined condition. The memory cartridge is detachably attached to such the information processing apparatus, and allows the processor to execute the program upon being attached thereto. The program includes the capacitor control program which charges and discharges the capacitor in each predetermined period. The power supply to the processor is stopped when the capacitor control program is not appropriately executed due to the processor error and thus the charged voltage of the capacitor does not meet the predetermined condition.

In still another aspect of the present invention, a home-use game device comprises: a system bus which is connected to a program memory upon attaching a memory cartridge having the program memory; a processor which is connected to the system bus and processes a game program stored in the program memory; a detecting means which detects a processor error; and a stopping means which stops a power supply to the processor when the error is detected.

In this aspect, the program memory in the memory cartridge is connected to the processor via the system bus when the memory cartridge is attached. The game program recorded in the program memory is processed by the processor. The power supply to the processor is stopped by the stopping means when the processor error is detected by the detecting means in the course of the processing.

In still further aspect of the present invention, a home-use karaoke device comprises: a system bus which is connected to a program memory when a memory cartridge having the program memory is attached; a processor which is connected to the system bus and processes a karaoke program stored in the program memory; a detecting means which detects a program error; and a stopping means which stops a power supply to the processor when the error is detected.

Also in this aspect, the program memory in the memory cartridge is connected to the processor via the system bus when the memory cartridge is mounted. The karaoke program recorded in the program memory is processed by the processor. The power supply to the processor is stopped by the stopping means when the processor error is detected by the detecting means in the course of the processing.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
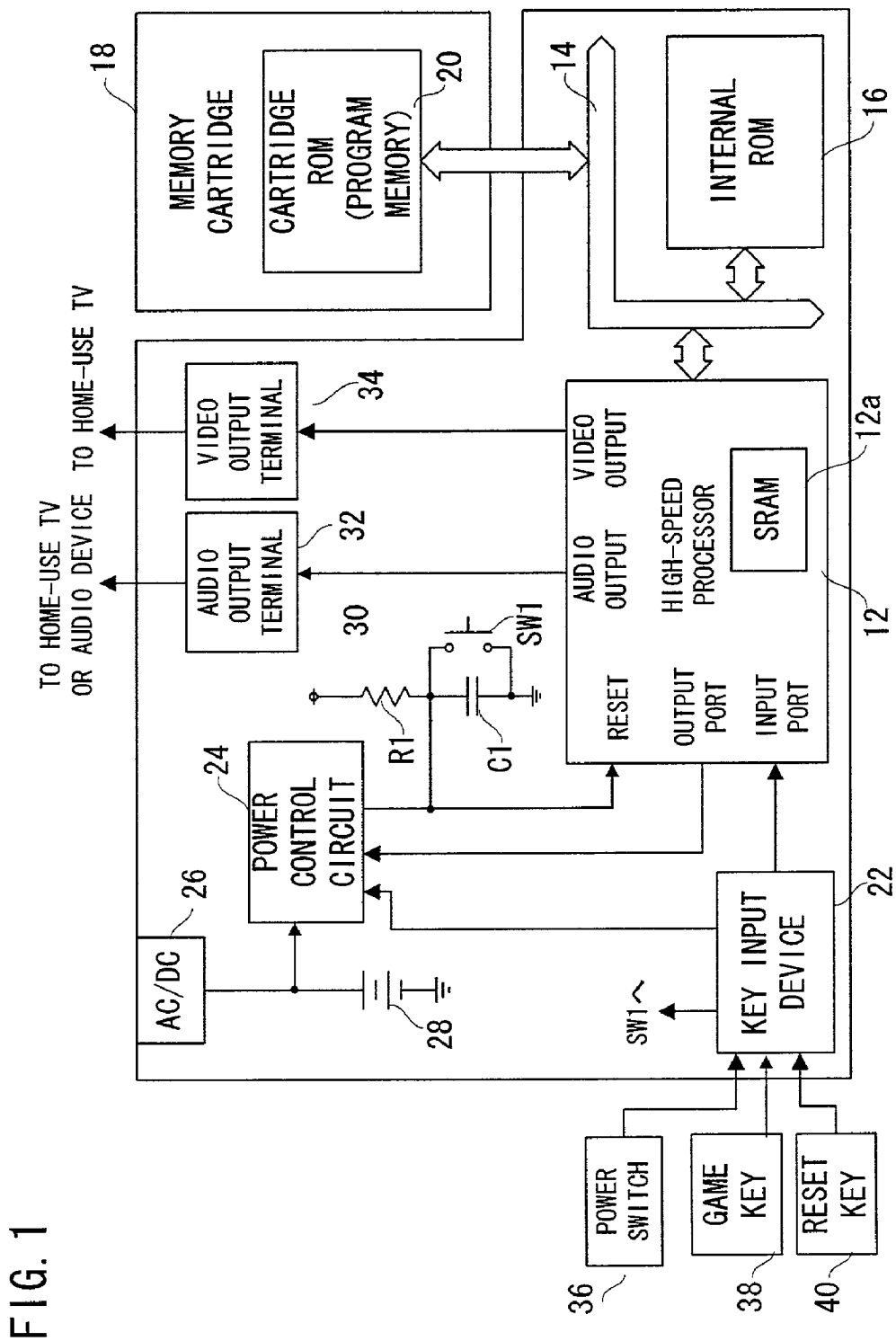
FIG. 1 is a block diagram showing one embodiment of the present invention.

Referring to FIG. 1 a home-use game device 10 in this embodiment includes a high-speed processor 12 which processes a game program. The high-speed processor 12 is connected, via a system bus 14, to a ROM 16 incorporated in a main body and to a ROM 20 incorporated in a memory cartridge 18, respectively. The memory cartridge 18 is detachable, and the ROM 20 is connected to the system bus 14 only when the memory cartridge 18 is attached to the home-use game device 10. In addition, a game program is recorded or stored in the ROM 20, and audio data and image data or video data are stored in advance in the ROM 16 to generate a sound effect and a game image.

In a case that a power switch 36 is turned on while the memory cartridge 18 is attached, a corresponding key input signal is applied to a power control circuit 24 from a key input device 22. Then, the power control circuit 24 generates a stabilized 3.3V constant voltage of 3.3 V on the basis of a DC outputted from a battery 28 or an AC/DC converter 26. Due to this, an entire system including the high-speed processor 12 is started. The high-speed processor 12 fetches a key input signal in correspondence to an operation of a game key 38 from the key input device 22, and processes a game program stored in the ROM 20. Subsequently, the high-speed processor 12 generates sound effect data and game image data on the basis of audio data and image data or video data recorded in the ROM 16. The generated sound effect data and the game image data are outputted to outside from an audio output terminal 32 and a video output terminal 34. It is noted that an SRAM 12a is an internal memory backed-up by the battery 28, and data (acquired item information, for example) generated through a game program processing is stored in this memory.

When a reset key 40 is operated, a corresponding key input signal is applied to a switch SW1 of a reset circuit 30 from the key input device 22, and the switch SW1 changes from off-state to on-state. When the switch SW1 is off-state, electric charges supplied via a resistor R1 from a power Vcc are accumulated in a capacitor C1, and a terminal voltage of the capacitor C1 shows a predetermined value. On the other and, when the switch SW1 turns into on-state, the terminal voltage of the capacitor C1 falls to a reference electric potential (0V). The high-speed processor 12 fetches the terminal voltage of the capacitor C1 from a reset terminal, and continues the process if the terminal voltage is a predetermined value, however, resets the process if the terminal voltage falls to the reference electric potential. Due to the reset, the processing off the game program is resumed from a start.

The game program includes a power control routine processed in response to an interruption at predetermined period intervals. The high-speed processor 12 outputs a control pulse from an output port on the basis of the power control routine. The power control circuit 24 continues to supply a power as and when the control pulse is properly outputted, however, stops the power supply if the power control routine is not properly processed due to an error of the high-speed processor 12, and the control pulse is not appropriately outputted. Due to a fact that the power supply is stopped, an entire system including the high-speed processor 12 turns into off-state.

It is noted that in the above described reset period, a power on/off circuit 24b (described later) that is included in the power control circuit 24 will not operate. That is, the power control circuit 24 never stops the power supply due to the reset operation.

Figure 2:
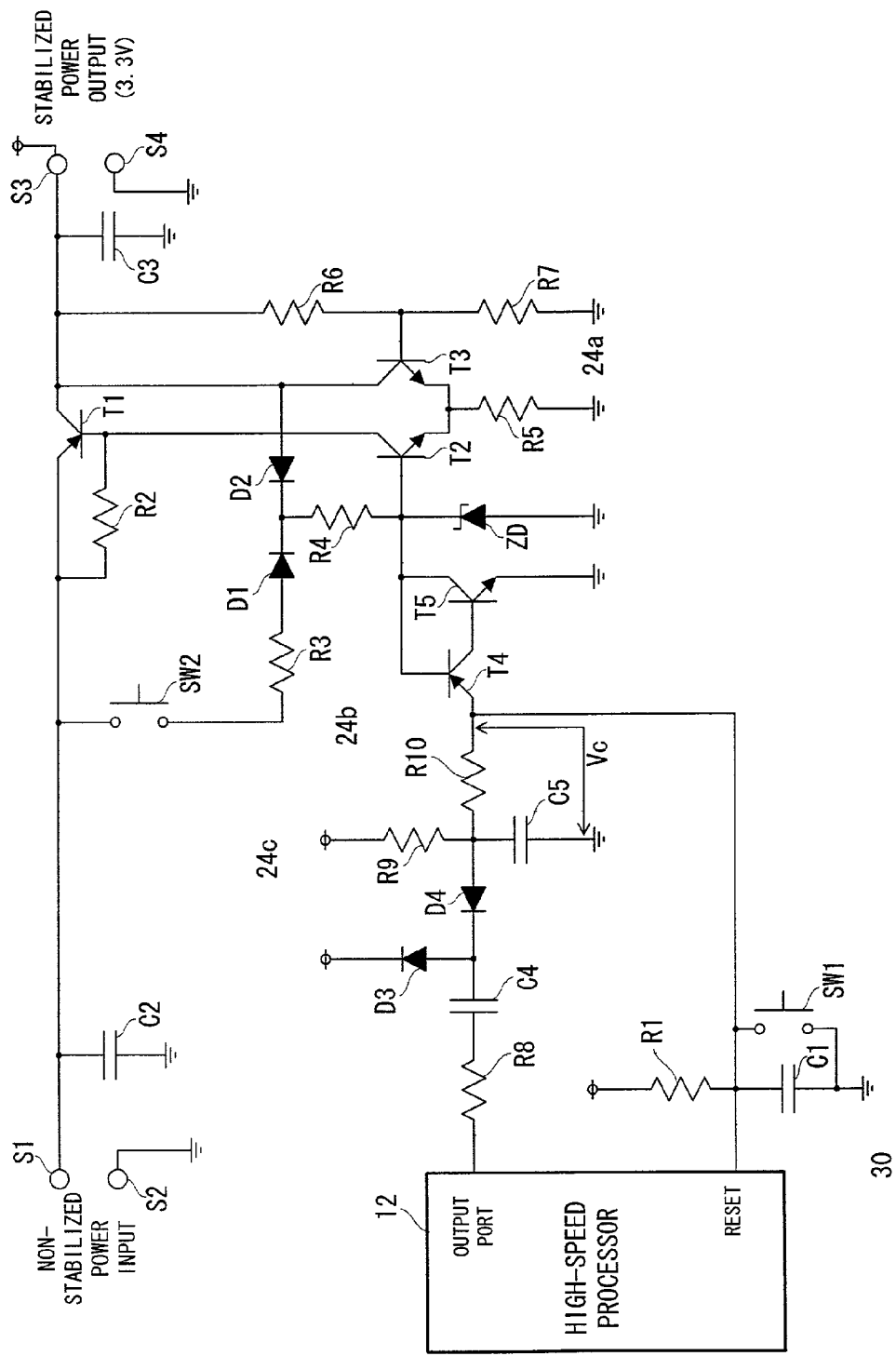
FIG. 2 is a circuit diagram showing structure of a power control circuit.

The power control circuit 24 is, more specifically, constructed as shown in FIG. 2. DC voltage outputted from the battery 28 or the AC/DC converter 26 is applied to a plus (+) input terminal S1. A minus (−) input terminal S2 is connected to a reference electrical potential surface or point, and the plus input terminal S1 is connected to the reference electrical potential surface or point via a capacitor C2, and to one end terminal of a resistor R3 via a switch SW2 which is operated with the power switch. The other end of the resistor R3 is connected to an anode of a diode D1, and a cathode of the diode D1 is connected to a cathode of a diode D2 and one end of a resistor R4. The anode of the diode D2 is connected to a collector of a transistor T3 which forms an output voltage control circuit 24a, and the other end of the resistor R 4 is connected to a cathode of a Zener diode ZD having an anode connected to the reference electric potential surface or point, and to a base of a transistor T 2 which forms the output voltage control circuit 24a, and to a collector of a transistor T5 which forms a power on/off control circuit 24b.

Emitters of the transistors T2 and T3 are connected to the reference electric potential surface or point via a resistor R5, and collectors of the transistors T2 and T3 are respectively connected to a base and a collector of the transistor T1. Also, a base of the transistor T3 is connected to the reference electric potential or point via a resistor R7, and in addition, to the collector of the transistor T1 via a resistor R6. An emitter of the transistor T1 is connected to the plus input terminal S1, and the collector of the transistor T1 is connected to a plus (+) output terminal S3, and a resistor R2 is inserted between the base and the emitter of the transistor T1. The plus output terminal S3 is connected to the reference electric potential surface or point via the capacitor C3, and a minus (−) output terminal S4 is directly connected to the reference electric potential surface or point.

An emitter of a transistor T5 is connected to the reference electric potential surface or point, and a base of the transistor T5 is connected to a collector of a transistor T4. A base of the transistor T4 is connected to the collector of the transistor T5, and an emitter of the transistor T4 is connected to one end of a resistor 10 which forms a charge pump circuit 24c. The emitter of the transistor T4 is also connected to a connection point of the capacitor C1 and the resistor R1which form a reset circuit 30.

The other end of the resistor R10 is connected to the reference electric potential surface or point via a capacitor C5, and to the power Vcc via a resistor R9. Herein, the power Vcc is a stabilized constant voltage power supplied from the plus output terminal S3. The other end of the resistor R10 is also connected to an anode of a diode D4, and a cathode of the diode D4 is connected to an anode of the diode D3 and one end of the capacitor C4. The cathode of the diode D4 is connected to the power Vcc, and the other end of the capacitor C4 is connected to an output port of the high-speed processor 12 via a resistor R8.

Figure 3:
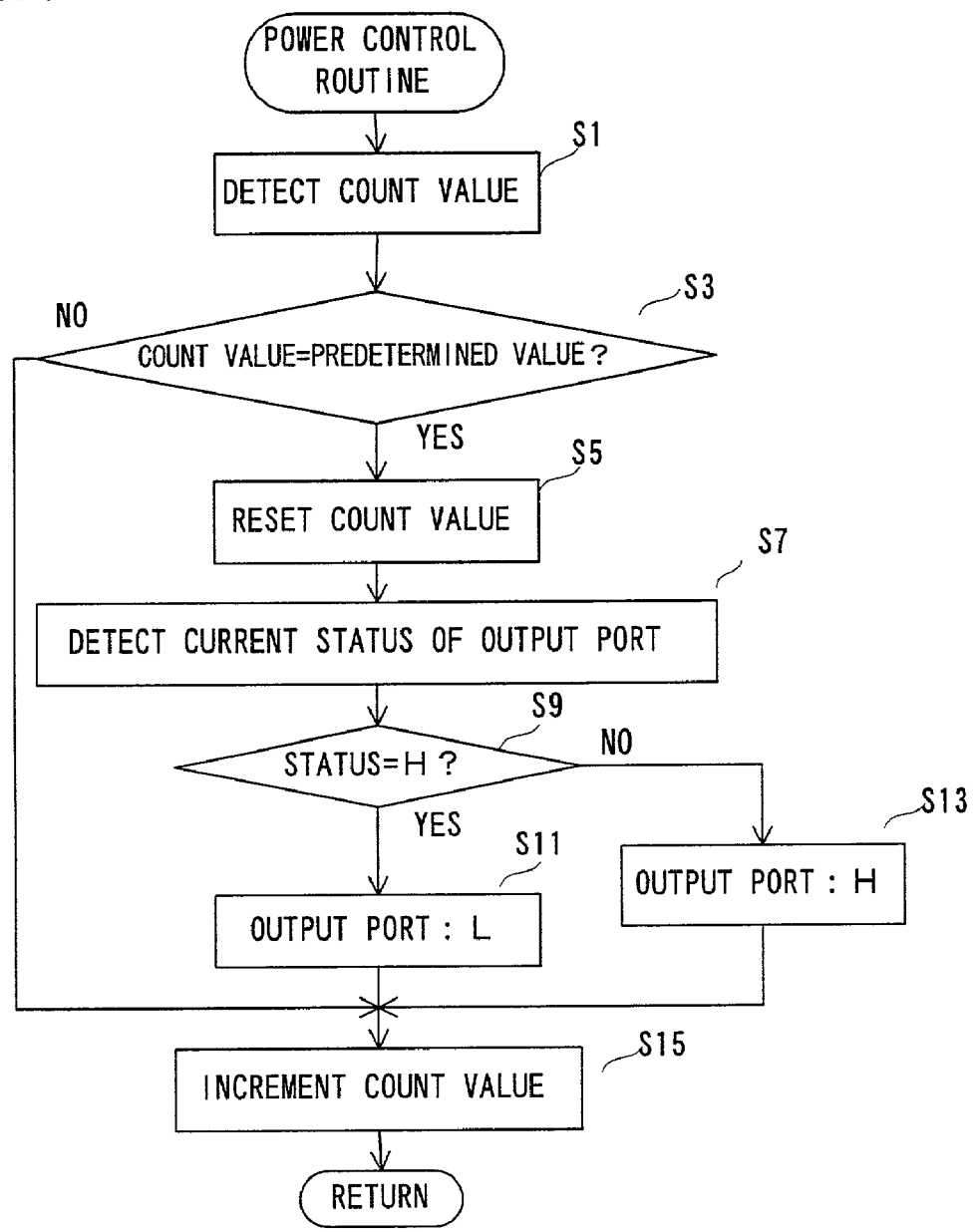
FIG. 3 is a flowchart showing a power control routine.

The high-speed processor 12 executes the power control routine shown in FIG. 3 in response to the interruption at each predetermined period. Firstly, in a step S1 a count value of a counter (not shown) is detected, and it is determined whether the detected value is equal to a predetermined value in a step S3. If the count value is smaller than the predetermined value, the count value is incremented in a step S15, and then the process returns to a main routine. On the other hand, if the count value is coincident with the predetermined value, the count value is reset in a step S5, and a current status of the output port is then detected in a step S7, and the detected status is determined in a following step S9. Then, if the detected status is the high-level, the process proceeds to the step S15 after changing the status of the output port to the low-level in a step S11, and if the detected status is the low-level, the process proceeds to the step S15 after changing the status of the output port to the high-level in a step S13. In the step S15 the count value is incremented as described above, and the process returns to the main routine upon completion of the processing. Due to a fact that such the processing is carried out, the control pulse which changes a level at each predetermined period is outputted from the output port.

When the power switch 36 is turned on, the switch SW2 shown in FIG. 2 is turned on in response thereto. At this time, DC voltage applied to the cathode of the Zener diode ZD is higher than a Zener voltage, and a DC current based upon the DC applied to the plus input terminal S1 flows into the reference electric potential surface or point via the switch SW2, the resistor R3, the diode D1, the resister R4 and the Zener diode ZD. The Zener voltage, i.e. constant voltage is applied to the base of the transistor T2, and this causes the transistors T2 and T1 to be turned on. A collector voltage of the transistor T1 is divided by the resistors R6 and R7, and the transistor T3 is turned on by a terminal voltage of the resistor 7.

A current amount which conducts through the transistors T2 and T3 is defined by the DC voltage applied to each base thereof. If an output voltage from the collector of the transistor T1 exceeds 3.3V, for example, a voltage which is generated by a voltage-dividing circuit formed of the resistors R6 and R7 and is added to the base of the transistor T3 exceeds the defined value. Therefore, a current which flows between the collector and the emitter of the transistor T3 increases, and a difference in electric potential generated at both ends of the register R5 becomes larger. A current flowing between the base and the emitter of the transistor T2 decreases because a voltage added to the base of the transistor T2 is held constant by the Zener diode ZD.

Accordingly, a current which flows between the collector and the emitter of the transistor T2 decreases, and a current which flows between the emitter and the collector of the transistor T1 also decreases. Therefore, a voltage outputted from the collector of the transistor T1 also decreases. Likewise, if the outputted voltage of the collector of the transistor T1 becomes smaller than 3.3V, the output voltage control circuit 24a functions as to increase the voltage outputted from the collector of the transistor T1. Thus, the constant voltage of 3.3V is held between the output terminals S3 and S4.

It is noted that the capacitors C2 and C3 are respectively to smooth the voltage of the non-stabilized power input and the stabilized power output.

The high-speed processor 12 executes the above described power control routine in response to the turning-on of the power switch 36, and outputs from the output port a control pulse having a level which changes at each predetermined period. In a case that the control pulse is the low-level, an electric charge charged in the capacitor C5 on the basis of the power Vcc is discharged and charges in the capacitor C4 via the diode D4. When the control pulse changes from the low-level to the high-level, the electric charge through the resistor R9 is charged into the capacitor C5, and the electric charge being charged in the capacitor C4 is discharged toward the power Vcc via the diode D3. During the control pulse repeats the level changing, the above described charge and discharge are repeated, and thus the difference in electric potential $V_C$ between the emitter of the transistor T4 and the reference electric potential surface or point never exceeds the predetermined threshold value.

However, if the power control routine is not properly processed due to an error of the high-speed processor, and the control pulse continues to showing the low-level or the high-level, the above described difference in electric potential exceeds the threshold value. That is, if the control pulse remains at the low-level, both of capacitors C5 and C4 are charged, and the difference in electric potential $V_C$ increases in accordance with an equation (1) after the capacitors C4 and C5 reaches a balanced state. Therefore, the difference in electric potential exceeds the threshold value.

$$V_C = e^{-t/((C4+C5) \cdot R9)} \quad (1)$$

On the other hand, when the control pulse maintains the high-level, the charging of the capacitor C5 continues, and the difference in electric potential increases in accordance with an equation(2). Due to this, the difference in electric potential exceeds the threshold value.

$$V_C = e^{-t/(C4 \cdot R9)} \quad (2)$$

The predetermined threshold value is equivalent to a sum $(V_{ZD}+V_{BE})$ of the Zener voltage $V_{ZD}$ and the base-emitter voltage $V_{BE}$ of the transistor T4. When the difference in electric potential $V_C$ exceeds the threshold value, the transistor T4 is turned on, and furthermore, the transistor T5 is turned on. Then, the DC current through the resistor R4 conducts the transistor T5 in stead of the Zener diode ZD, and the Zener diode ZD returns to a normal state. When the transistor T5 is turned on, the transistors T1–T3 are turned off, and the output of the stabilized power from the plus output terminal S3 is stopped. Thus, the entire system including the high-speed processor 12 is turned off.

If the reset key 40 is operated at a time that the high-speed processor 12 properly executes the power control routine, the switch SW1 is turned on in response thereto. Then, one end of the resistor R10 is connected to the reference electric potential surface or point, and the electric charge of the capacitor C5 is discharged to the reference electric potential surface or point via the switch SW1. Therefore, it does not occur that the difference in electric potential $V_C$ exceeds the threshold value after the reset key 40 is depressed and that the output of the stabilized power from the plus output terminal S3 is stopped. The high-speed processor 12 restarts the game program processing after the reset.

As understood from the above descriptions, when the memory cartridge 18 is attached, the ROM 20 is connected to the high-speed processor 12 via the system bus 14. The program recorded in the ROM 20 is processed by the high-speed processor 12. If the high-speed processor 12 runs out of control in the course of the processing, the difference in electric potential $V_C$ between the one end and of the resistor R10 which forms the charge pump circuit 24c and the reference electric potential surface or point increases. Due to this, the transistors T4 and T5 are turned on. Then, the transistor T2, and in turn the transistor T1 are turned off, and this causes the power supply to the entire system including the high-speed processor 12 to be stopped. The program processing is then also stopped now that the power supply to the high-speed processor 12 has been stopped.

The programs processed by the high-speed processor 12 include the power control routine (capacitor control program). By the power control routine, the control pulse having the level which varies in each predetermined period is outputted from the output port of the high-speed processor 12. The capacitors C4 and C5 repeat the charge and discharge in response to such the control pulse. Due to a fact that the high-speed processor 12 runs out of control, the control pulse remains the high-level or low-level, and then the charge to the capacitor C5 is continued, and therefore, the above described difference in electric potential increases. Due to this, if the difference in electric potential $V_C$ exceeds the predetermined value, the power supply to the entire system including the high-speed processor 12 is stopped.

No data of the SRAM12a is destroyed even in a case that the high-speed processor 12 runs out of control as a result of retrieving the memory cartridge 18 because it is arranged in such a manner that the power supply to the high-speed processor 12 is stopped if an error occurs in the high-speed processor 12.

It is noted that although in this embodiment descriptions are made by using a home-use game device, the present invention may be applied to a home-use karaoke device. In this case, karaoke music data (basic music source) and karaoke image or video data (title screen, basic background screen) are stored or recorded in the ROM 16 incorporated in the main body, and a karaoke program (for a music reproduction control, for a video or image reproduction control) and musical script data that is worth a plurality of musics are stored or recorded in the ROM 20 incorporated in the memory cartridge. In addition, a music number changing key is provided in stead of the game key 38. If the operator operates the music number changing key, a music data of the desired music is outputted from the output terminal 32, and image or video data including lyrics is outputted from the image output terminal 34.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus to which a memory cartridge having a program memory is attached, comprising:
    a system bus which is connected to said program memory upon attaching said memory cartridge;
    a processor connected to said system bus for processing a program stored in said program memory and for generating a pulse signal;
    a power control circuit coupled to said processor for supplying power to said information processing apparatus when said pulse signal is generated;
    a detecting means for detecting an error of said processor; and
    a stopping means for stopping the power control circuit from supplying the power to said information processing apparatus when the detecting means detects the error of said processor and when said processor stops generating said pulse signal, wherein said information processing apparatus goes into an off-state without depending on a timer.

2. An information processing apparatus according to claim 1, wherein said processor generates said pulse signal on the basis of said program,
    said detecting means includes a charging and discharging means which repeats a charge and discharge in response to said pulse signal, and said stopping means stops said power supply when a charged voltage of said charging and discharging means does not meet a predetermined condition.

3. An information processing apparatus according to claim 2, wherein said pulse signal is a signal having a level that varies between the low-level and the high-level periodically, said charging and discharging means includes a first capacitor which discharges an electric charge when said pulse signal is said low-level, and charges an electric charge when said pulse signal is said high-level, and a second capacitor which charges an electric charge when said pulse signal is said low-level, and discharges an electric charge when said pulse signal is said high-level, and said stopping means stops said power supply when a charged voltage of at least one of said first capacitor and said second capacitor exceeds a predetermined value.

4. An information processing apparatus according to claim 2 or 3, further comprising:

an instructing means which instructs a reset of said processor; and a discharging path which is enabled in response to an instruction of said instructing means and discharges an electric charge being charged in said charging and discharging means.

5. A memory cartridge system, comprising:

a memory cartridge having a program memory;

a processor which is connected to said program memory upon attaching said memory cartridge and processes a program stored in said program memory;

a capacitor which is repeatedly charged and discharged in response to a pulse signal; and a stopping means which stops a power supply to said processor when a charged voltage of said capacitor does not meet a predetermined condition, wherein said program includes a level control program which maintains the charged voltage of said capacitor within a predetermined condition by varying a level of said pulse signal in each predetermined period.

6. A memory cartridge which is detachably attached to an information processing apparatus which stops a power supply to a processor when a charged voltage of a capacitor does not meet a predetermined condition, and stores a program which allows said processor to execute, wherein said program includes a capacitor control program which maintains the charged voltage of said capacitor within said predetermined condition by charging and discharging said capacitor in each predetermined period.

7. A home-use game device, comprising:

a system bus which is connected to a program memory upon attaching a memory cartridge having a program memory;

a processor connected to said system bus for processing a game program stored in said program memory and for generating a pulse signal;

a power control unit coupled to said processor for supplying power to said home-use game device when said pulse signal is generated;

a detecting means for detecting an error of said processor; and a stopping means for stopping the power control unit from supplying the power to said home-use game device when the detecting means detects the error of said processor and when said processor stops generating said pulse signal, wherein said home-use game device goes into an off-state without depending on a timer.

8. A home-use karaoke device, comprising:

a system bus which is connected to a program memory upon attaching a memory cartridge having a program memory;

a processor connected to said system bus for processing a karaoke program stored in said program memory and for generating a pulse signal;

a power control unit coupled to said processor for supplying power to said home-use karaoke device when said pulse signal is generated:

a detecting means for detecting an error of said processor; and a stopping means for stopping the power control unit from supplying the power to said home-use karaoke device when the detecting means detects the error of said processor and when said processor stops generating said pulse signal, wherein said home-use karaoke device goes into an off-state without depending on a timer.

9. A home-use game device, comprising:

a system bus which is connected to a program memory upon attaching a memory cartridge having a program memory;

a processor which is connected to said system bus and processes a game program stored in said program memory;

a detecting means which detects an error of said processor; and a stopping means which stops a power supply to said processor when said error is detected, wherein said processor generates a pulse signal on the basis of said program, said detecting means includes a charging and discharging means which repeats a charge and discharge in response to said pulse signal, and said stopping means stops said power supply when a charged voltage of said charging and discharging means does not meet a predetermined condition.

10. A home-use karaoke device, comprising:

a system bus which is connected to a program memory upon attaching a memory cartridge having a program memory;

a processor which is connected to said system bus and processes a karaoke program stored in said program memory;

a detecting means which detects an error of said processor; and a stopping means which stops a power supply when said error is detected, wherein said processor generates a pulse signal on the basis of said program, said detecting means includes a charging and discharging means which repeats a charge and discharge in response to said pulse signal, and said stopping means stops said power supply when a charged voltage of said charging and discharging means does not meet a predetermined condition.

11. An information processing apparatus to which a memory cartridge having a program memory is attached, comprising:

a system bus which is connected to said program memory upon attaching said memory cartridge;

a processor which is connected to said system bus and processes a program stored in said program memory;

a detecting means which detects an error of said processor; and a stopping means for shutting down said information processing apparatus into an off-state when said error is detected, wherein said processor generates a pulse signal on the basis of said program, said detecting means includes a charging and discharging means which repeats a charge and discharge in response to said pulse signal, and said stopping means stops said power supply when a charged voltage of said charging and discharging means does not meet a predetermined condition.

12. An information processing apparatus according to claim 11, wherein said pulse signal is a signal having a level that varies between the low-level and the high-level periodically, said charging and discharging means includes a first capacitor which discharges an electric charge when said pulse signal is said low-level, and charges an electric charge when said pulse signal is said high-level, and a second capacitor which charges an electric charge when said pulse signal is said low-level, and discharges an electric charge when said pulse signal is said high-level, and said stopping means stops said power supply when a charged voltage of at least one of said first capacitor and said second capacitor exceeds a predetermined value.

13. An information processing apparatus according to claim 12, further comprising:

an instructing means which instructs a reset of said processor; and a discharging path which is enabled in response to an instruction of said instructing means and discharges an electric charge being charged in said charging and discharging means.

14. A home-use game device, comprising:

a system bus which is connected to a program memory upon attaching a memory cartridge having a program memory;

a processor which is connected to said system bus and processes a game program stored in said program memory;

a detecting means which detects an error of said processor; and a stopping means for shutting down said game device into an off-state when said error is detected, wherein said processor generates a pulse signal on the basis of said program, said detecting means includes a charging and discharging means which repeats a charge and discharge in response to said pulse signal, and said stopping means stops said power supply when a charged voltage of said charging and discharging means does not meet a predetermined condition.

15. A home-use karaoke device, comprising:

a system bus which is connected to a program memory upon attaching a memory cartridge having a program memory;

a processor which is connected to said system bus and processes a karaoke program stored in said program memory;

a detecting means which detects an error of said processor; and a stopping means for shutting down said karaoke device into an off-state when said error is detected, wherein said processor generates a pulse signal on the basis of said program, said detecting means includes a charging and discharging means which repeats a charge and discharge in response to said pulse signal, and said stopping means stops said power supply when a charged voltage of said charging and discharging means does not meet a predetermined condition.

* * * * *